(12) United States Patent
Fujita et al.

(10) Patent No.: US 6,777,849 B2
(45) Date of Patent: Aug. 17, 2004

(54) BRUSH HOLDER STAY OF ROTARY ELECTRIC MACHINE

(75) Inventors: Yusuke Fujita, Yamada-gun (JP); Keiji Kiuchi, Nitta-gun (JP); Shinichi Hagiwara, Isesaki (JP); Ken Yamamoto, Nitta-gun (JP); Tomio Kudo, Ashikaga (JP)

(73) Assignee: Mitsuba Corporation, Kiryu (JP)

( * ) Notice: Subject to any disclaimer, the term of this patent is extended or adjusted under 35 U.S.C. 154(b) by 0 days.

(21) Appl. No.: 10/601,641

(22) Filed: Jun. 24, 2003

(65) Prior Publication Data
US 2004/0000835 A1 Jan. 1, 2004

(30) Foreign Application Priority Data

Jul. 1, 2002 (JP) ......................................... 2002-192314

(51) Int. Cl.[7] .............................................. H02K 13/00
(52) U.S. Cl. .......................... 310/239; 310/243; 310/90
(58) Field of Search ................................ 310/239, 243, 310/90, 238, 89

(56) References Cited

U.S. PATENT DOCUMENTS

| | | | | |
|---|---|---|---|---|
| 3,028,515 A | * | 4/1962 | Cheetham ................... | 310/247 |
| 3,624,434 A | * | 11/1971 | Dafler et al. ............... | 310/60 R |
| 3,794,869 A | * | 2/1974 | Apostoleris .................. | 310/90 |
| 4,801,833 A | * | 1/1989 | Dye ............................ | 310/239 |
| 5,089,735 A | * | 2/1992 | Sawaguchi et al. ........... | 310/88 |
| 5,497,039 A | * | 3/1996 | Blaettner et al. ............. | 310/51 |
| 5,949,173 A | * | 9/1999 | Wille et al. .................. | 310/220 |

* cited by examiner

*Primary Examiner*—Thanh Lam
(74) *Attorney, Agent, or Firm*—Oliff & Berridge, PLC

(57) ABSTRACT

In a rotary electric machine using a sintered oil-impregnated bearing, oil that oozes out from the sintered oil-impregnated bearing is prevented from attaching onto a brush. In a stay part providing a brush holder stay, there is formed a through hole into which the sintered oil-impregnated bearing is fitted. A pair of holder portions that each accommodate therein a brush are formed to diametrically face each other. A terminal-fixing portion is formed on one side of each holder portion. A prescribed gap exists between the one side position and the terminal-fixing portion. By closing the inner-radial end of the gap by an end wall, a first oil pool is formed. Thus, the first oil pool is structured as an oil pool on an oil path of any oozed oil flowing from the through hole toward the outer radial side of the holder portion to prevent the oil from entering the holder portion.

16 Claims, 12 Drawing Sheets

BRUSH HOLDER STAY OF ROTARY ELECTRIC MACHINE

BACKGROUND OF THE INVENTION

1. Field of Invention

The invention is pertinent to a brush holder stay of a rotary electric machine that is used in, for example, a driving part of each of various kinds of actuators installed in an automotive vehicle, etc.

2. Description of Related Art

In general, among that type of rotary electric machines, there is the one wherein a commutator is integrally fitted onto a rotating shaft rotatably supported on a casing; a brush supported on the casing side is in sliding contact with the commutator; and, by doing so, the power is supplied to the coil disposed around the outer periphery of the rotating shaft. In this case, the brush is supported so that it may freely move out from and into a holder portion integrally formed on a ring-like stay part where a through hole is formed in order to pass through the rotating shaft. In the brush holder stay equipped with the stay part and the holder portion, it sometimes has a structure wherein a bearing is integrally fitted into the through hole of the stay part and, one end portion of the rotating shaft is supported by the bearing. In such an arrangement, sometimes, of a sintered oil-impregnated bearing constructed by sintering metal powder (e.g. copper powder) and impregnating oil into fine cavities of the sintered material is used as the bearing.

In the rotary electric machine using the conventional sintered oil-impregnated bearing, in a case where the dynamo-electric machine is placed in a high-temperature environment, it is possible that the oil will ooze from the sintered material due to the difference between the thermal coefficient of expansion of the sintered material (bearing) and that of the oil impregnated in the sintered material. In a case where the rotary electric machine has been placed under a high-temperature condition like that, as illustrated in FIG. 12, the oil oozes from the sintered oil-impregnated bearing 13 and oozes into the through hole 15a of the stay part 15 of the brush holder stay 14. In this case, the oil that has oozed out is assumed to pass through the corner portion formed by a holder portion 16, projectingly formed on the ring-like stay part 15, and the stay part 15, due to capillary action, around to the outside-radial side of the holder portion 16 and from the outside-radial side into the holder (undesignated). In the case where the oil has oozed into the holder portion 16, there is the possibility that the oil will ooze between the brush 17 and the commutator 18. When that occurs, problems, such as the electrical conduction between the brush 17 and the commutator 18 deteriorating and the brush 17 wearing abnormally occurs. In this respect, there exists a need to address the problems that the invention is to achieve.

SUMMARY OF THE INVENTION

The invention has been made under the above-described circumstances and has an object to solve the above-described problems, the object being to provide a brush holder stay of a rotary electric machine, the brush holder stay comprising a ring-shaped stay part that has formed therein, on its inner-radial side, a through hole having fitted thereinto a sintered oil-impregnated bearing for supporting a rotating shaft and a holder portion that is integrally formed on the stay part and that accommodates therein a brush slide in contact with a commutator fitted over the rotating shaft in such a manner that the brush freely moves out from and into the holder portion, wherein the stay part is provided with a concave groove portion located on at least one side of the holder portion in the circumferential direction and the concave groove portion is formed with an end wall on the inner radial side and having a depth parallel to the axial direction of the rotating shaft so as to serve as an oil pool for an oil path which goes from the through hole toward the outer-radial side of the holder portion via the stay part.

And, by doing like that, it is possible to prevent the occurrence of the inconvenience that the oil goes into the inside-radial side of the holder portion and thereby attaches onto the brush.

In the above-described arrangement, it can be arranged that the end wall is formed so as to be connected to an inner-radial side end surface of the holder portion.

Further, in such an arrangement, it can be arranged that the concave groove portion has substantially the same length as the that of the holder portion in the radial direction.

Further, in that arrangement, it can be arranged that the concave groove portion is formed between the holder portion and a terminal-fixing portion formed adjacent to the holder portion.

Further, the invention provides a brush holder stay of a rotary electric machine, the brush holder stay comprising a ring-shaped stay part that has formed therein on its inner-radial side a through hole having fitted thereinto a sintered oil-impregnated bearing for supporting a rotating shaft and a holder portion that is integrally formed on the stay part and that accommodates therein a brush slide in contact with a commutator fitted over the rotating shaft in such a manner that the brush freely moves out from and into the holder portion, wherein the stay part is provided with a concave groove portion located on inner-radial side end surface between the holder portion and the through hole and concave in the outer-radial direction of the rotating shaft so as to serve as an oil pool for an oil path which goes from the through hole toward the holder portion.

And, by doing such, it is possible to prevent the occurrence of an inconvenience that the oil goes into the inside-radial side of the holder portion and thereby attaches onto the brush.

In the above-described arrangement, it can be arranged that the brush holder stay of the invention has a structure where the brush holder stay has formed thereon a pair of holder portions diametrically opposing each other and the paired holder portions are disposed in a positional relationship wherein they oppose each other substantially in the up-and-down direction relative to a horizontal rotating shaft axis.

BRIEF DESCRIPTION OF THE DRAWINGS

The invention will be described with reference to the drawings, in which.

DETAILED DESCRIPTION OF PREFERRED EMBODIMENTS

Figure 1:
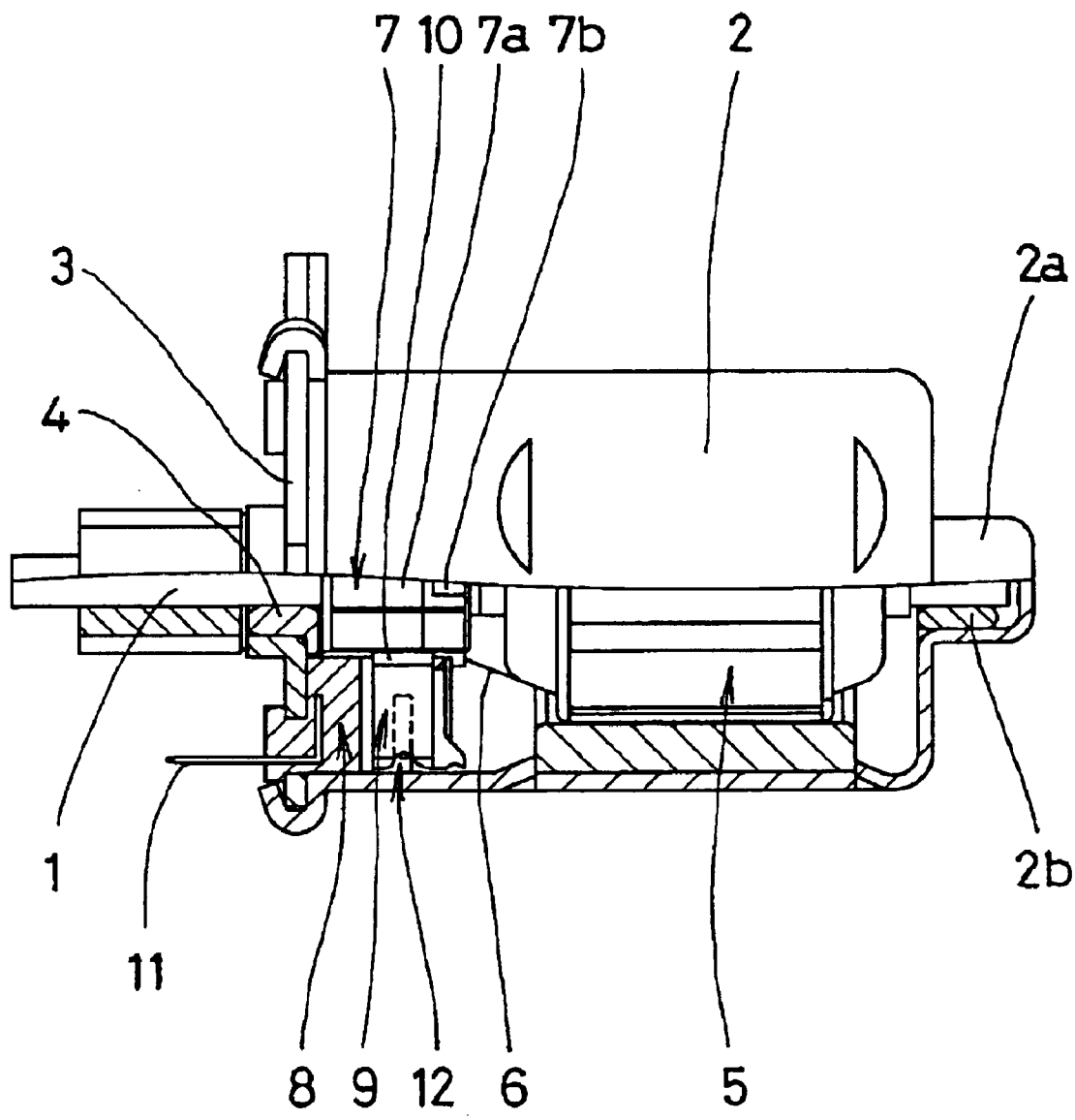
FIG. 1 is a side view, partly in section, of a dynamo-electric machine.
Figure 2:
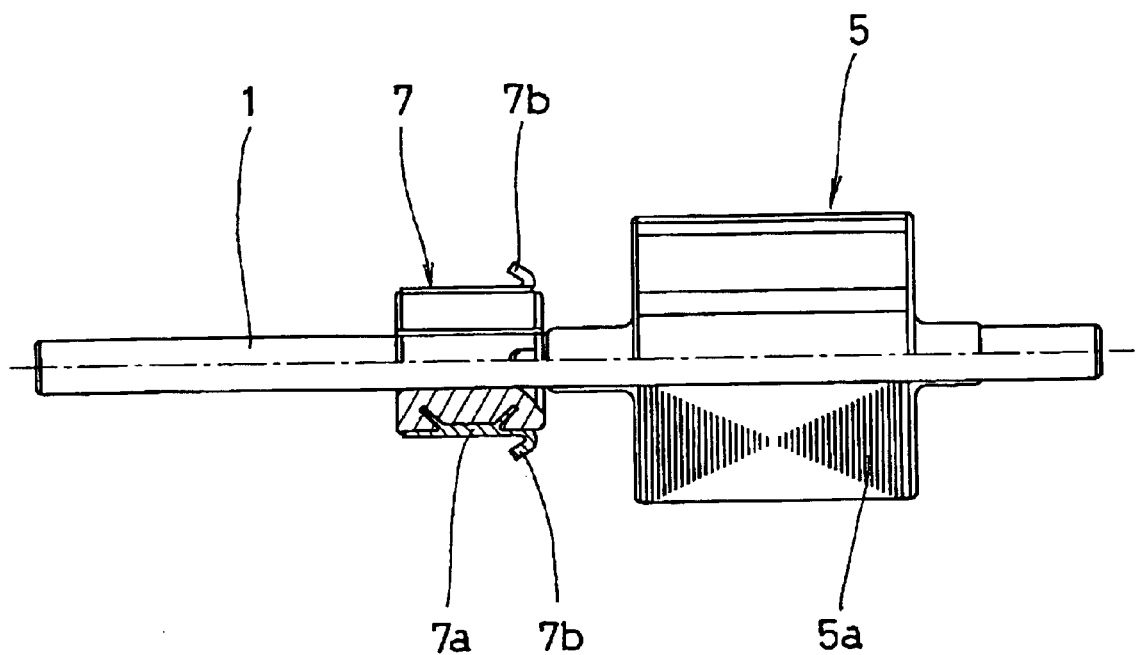
FIG. 2 is a side view illustrating a state where a coil has been removed from an armature of the rotary electric machine.

Next, a first embodiment of the invention will be explained with reference to FIGS. 1 to 8.

In the drawings, reference numeral 1 denotes a rotating shaft of a rotary electric machine composing an actuator that is mounted on an automotive vehicle. The rotating shaft 1 has one end rotatably supported, via a bearing 2b, by a bearing portion 2a located at a bottom surface of a bottomed cylindrical yoke 2. The other end thereof is rotatably supported via a bearing 4 disposed on an end cover 3 that is so disposed as to cover a cylindrical opening end of the yoke 2. An armature core 5, constructed by laminating a core member 5a, shaped like a flat plate ring, from a plurality of sheets, is integrally fitted over one half portion of the rotating shaft 1 which is internally mounted within the yoke 2. Onto the armature there is wound a coil 6. On the portion of the rotating shaft 1 located at the other-end of the armature core 5, that portion being located in the vicinity of the opening end of the yoke 2, is an integrally, externally fitted commutator 7. And end portions of the coils 6 are connected to risers 7b of a plurality of segments that have been disposed in the circumferential direction on the outer-peripheral surface of the commutator 7. The armature of the rotary electric machine has a structure as described.

The end cover 3 is formed in the shape of a flat plate and has on its outer periphery an attaching portion 3a, which projects in a radial direction from the center of the end cover 3. A through hole 3b for supporting the rotating shaft 1 is formed in the shape of a cylinder. And, into that through hole 3b, there is integrally fitted the above-described bearing 4, which is a sintered oil-impregnated bearing 4 of the invention. Here, the sintered oil-impregnated bearing 4 has a flange portion 4b formed on one-end side (on the inside of the yoke 2) of a main body portion 4a supporting the rotating shaft 1. The sintered oil-impregnated bearing 4 is positioned so that one surface of the flange portion 4b abuts against a flat surface of the end cover. Reference symbol 4c denotes a plate that is disposed from an outer-peripheral surface of the flange portion 4b and along an end surface of the flange portion 4b.

On the inner surface, i.e., the surface facing the interior of the yoke 2 of the end cover 3 there is integrally disposed a brush holder stay S to which the invention has been applied.

The brush holder stay S is integrally molded to the end cover 3 using a resinous material. The brush holder stay S is provided with a ring-shaped stay part 8 that has formed therein a through hole 8a having fitted therein the outer periphery of the flange portion 4b of the sintered oil-impregnated bearing 4 and a pair of holder portions 9 that are radially disposed on a side surface of the stay part 8 in an opposing relationship to one another.

Figure 3:
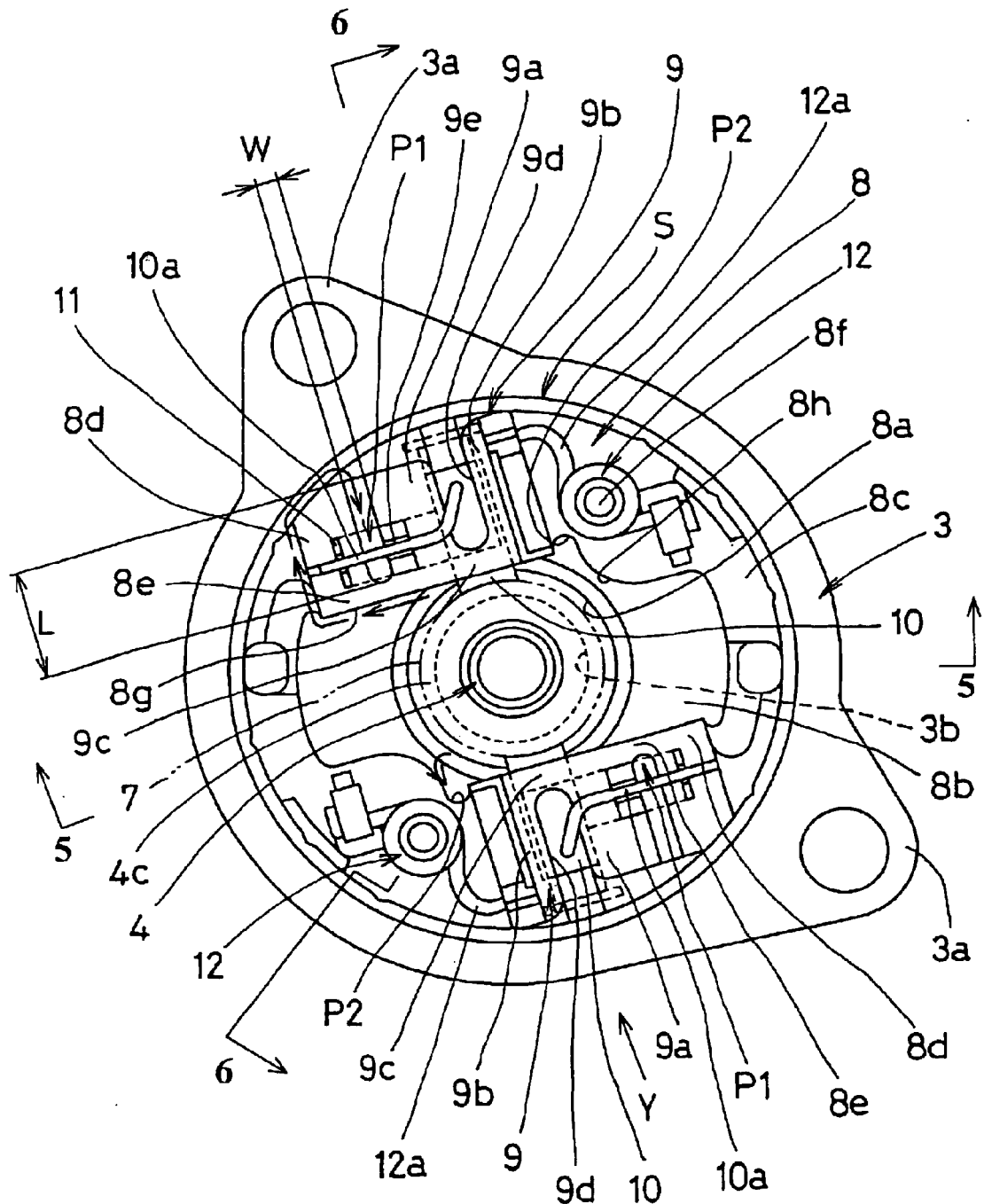
FIG. 3 is a front view of a brush holder stay.
Figure 4:
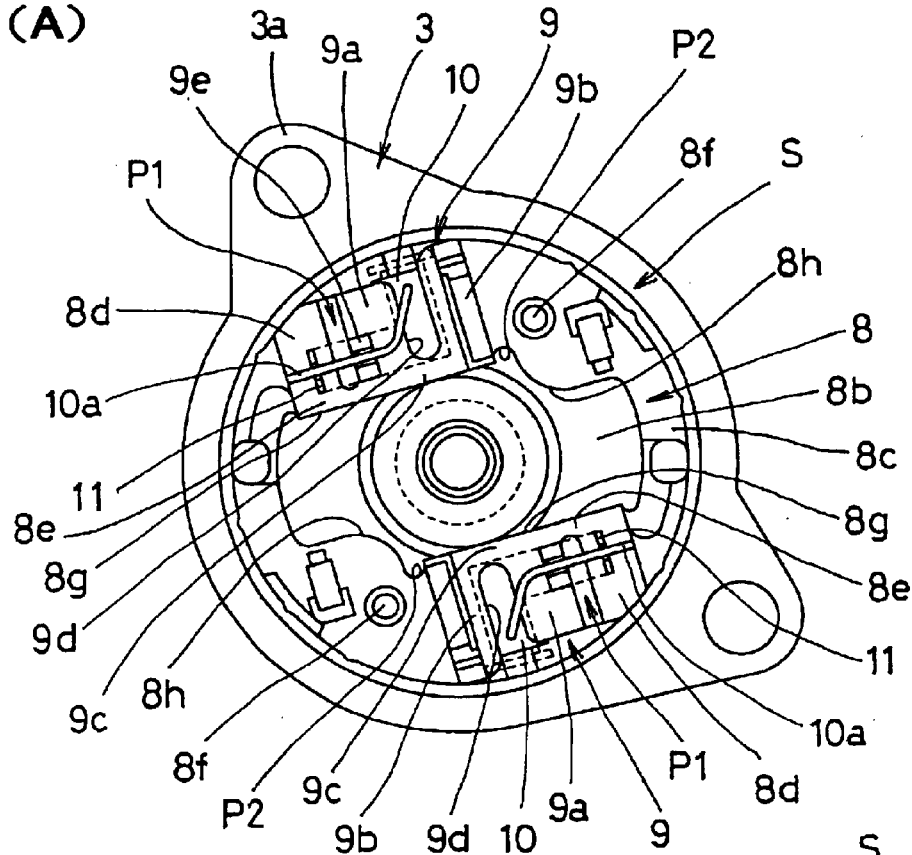
FIGS. 4(A) and 4(B) are a front view and rear view, respectively, each illustrating a state where an urging spring member has been removed from the brush holder stay.
Figure 4:
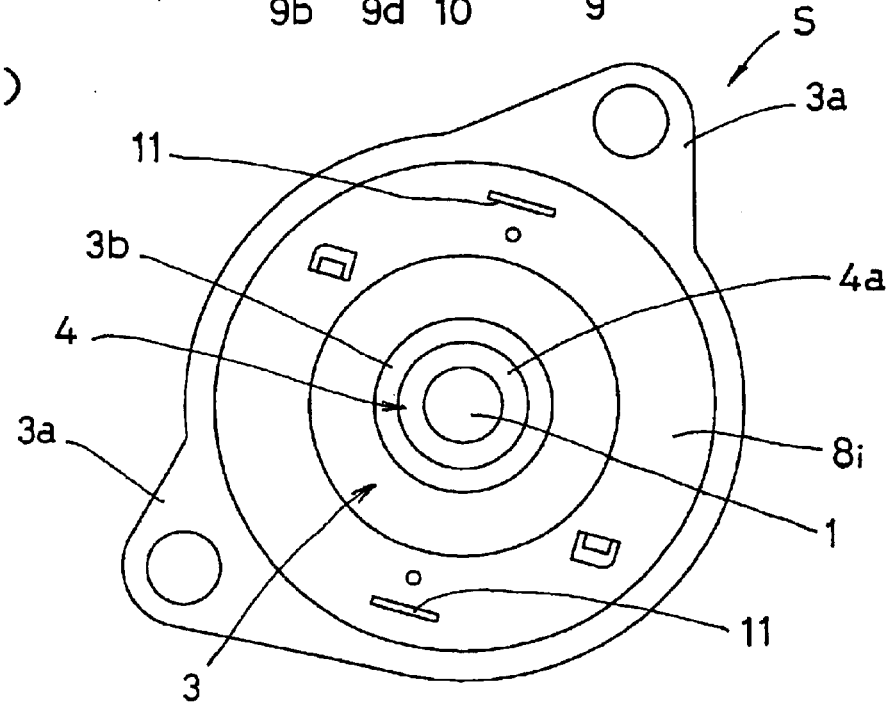
Figure 5:
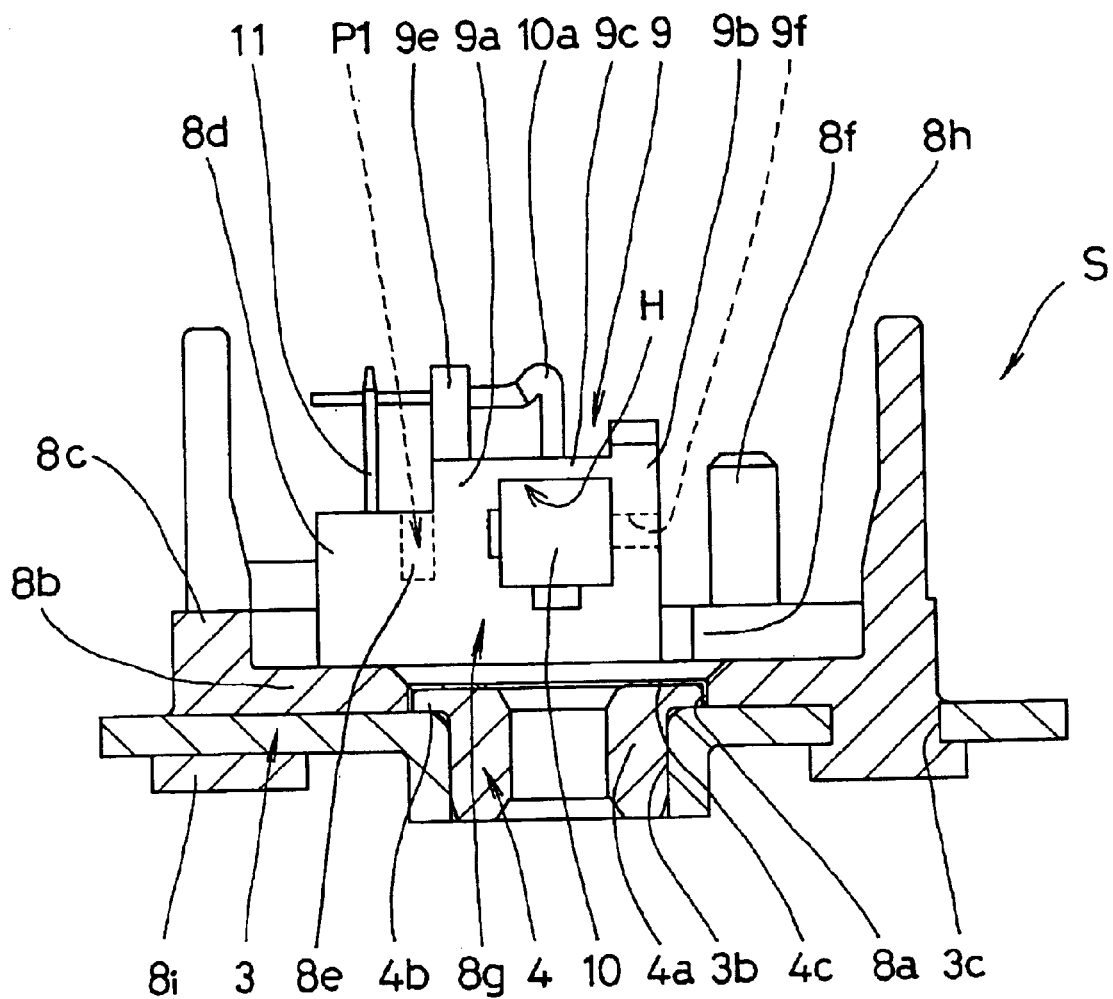
FIG. 5 is a sectional view taken along a line 5—5 of FIG. 3.
Figure 6A:
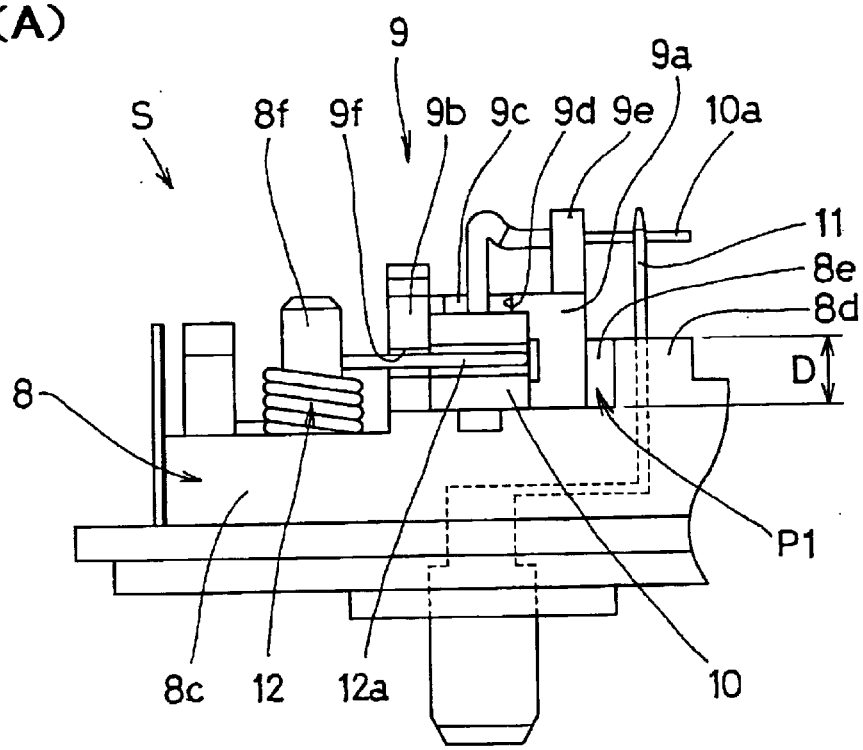
FIGS. 6(A) and 6(B) are, respectively, a view taken from a direction indicated by the arrow Y, and a 6—6 sectional view, of FIG. 3.
Figure 6B:
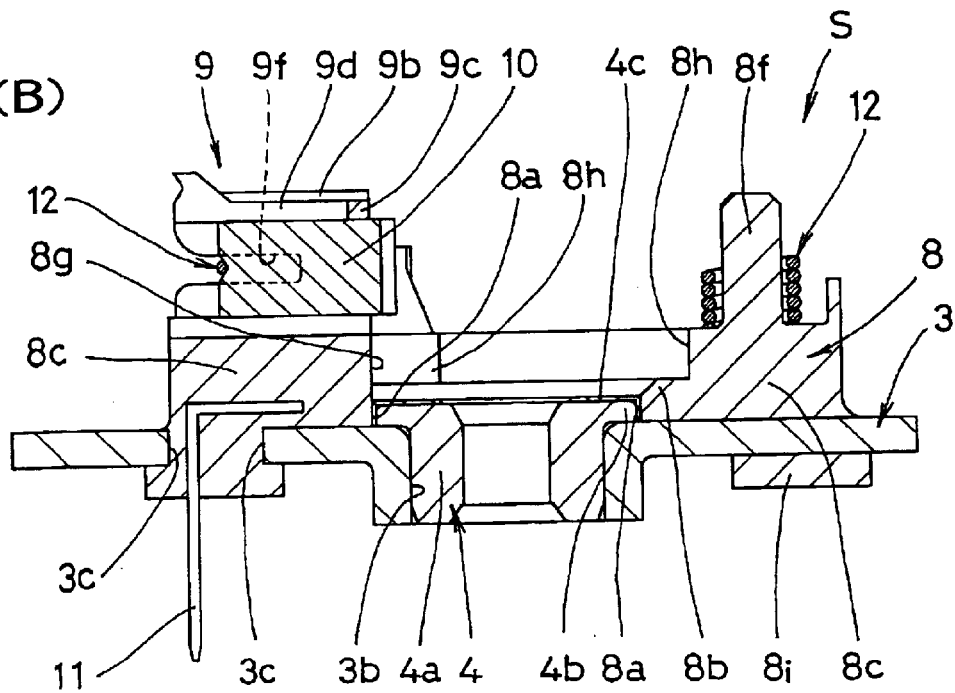

In the stay part 8, the portion located on the inner-radial side is thinner in the axial direction forming a thin-wall portion 8b. However, the thin-wall portion 8b, as illustrated in FIGS. 3 and 4(A), is formed into a laterally elongate configuration as if it is divided into upper and lower parts with respect to the through hole 8a. Further, on the outer-diameter side of the thin-wall portion 8b, is a thick-wall portion 8c having a level difference from the thin-wall portion 8b. Formed on the thick-wall portion 8c, are a pair of upper/lower holder portions 9 in the way of their opposing each other in the radial direction.

Each holder portion 9 is provided with a pair of side piece portions 9a, 9b that project axially toward the yoke inner side and that face each other in the circumferential direction and a connection piece portion 9c that connects the projecting end of each side piece portion 9a, 9b. A radially elongate space H is formed by being enclosed by the three piece portions 9a, 9b, 9c and the thick-walled portion 8c of the stay S. In each space H, a brush 10 is installed freely and movably in the radial direction. Here, for the convenience of explanation, a detailed explanation will be made by using the upper-side holder portion 9 of FIG. 3 (top side of the figure) and, regarding the side piece portions 9a, 9b, they are designated left and right side piece portions 9a, 9b. Further, the holder portions 9 are disposed point-symmetrically with respect to the stay part 8, and various kinds of members as later described that are provided on the stay part 8 are also disposed point-symmetrically as well. Therefore, the explanation is made by using the upper-side holder portion 9 of FIG. 3 as a reference, and an of the lower-side holder-portion 9 will be omitted.

A pig tail 10a is connected on the upper surface of the brush 10. The pig tail 10a is drawn out from a draw-out groove 9d notched in the holder connection piece portion 9c on the inner yoke side of the holder stay S. On one side, as viewed in the circumferential direction of the holder portion 9, on the stay-part thick-wall portion 8c and to the left of the holder-portion left side piece portion 9a, is formed a terminal-fixing portion 8d that projects toward the inner yoke side. A terminal 11 is fixed in the terminal-fixing portion 8d in a state in which it passes therethrough in the axial direction. The pig tail 10a, that is drawn out from the draw-out groove 9d, is connected to the terminal 11 via a support piece portion 9e formed at the left side of the holder portion connection portion 9c. It is to be noted that the connection portion of the terminal 11 and the support piece portion 9e for connecting to the pig tail 10a are formed in a positional relationship such that they are at substantially the same relative positions in the axial direction and are parallel with each other in the left-and-right direction. This structure provides that a force does not excessively act on the pig tail 10a. Also, the terminal-fixing portion 8d is formed so as to reach the outer surface side of the end plate from the yoke via a communication hole 3c formed in the end plate 3 (FIG. 6(B)). Thereby the terminal 11 is drawn out to the outer side of the end plate 3 and is electrically insulated.

Figure 7:
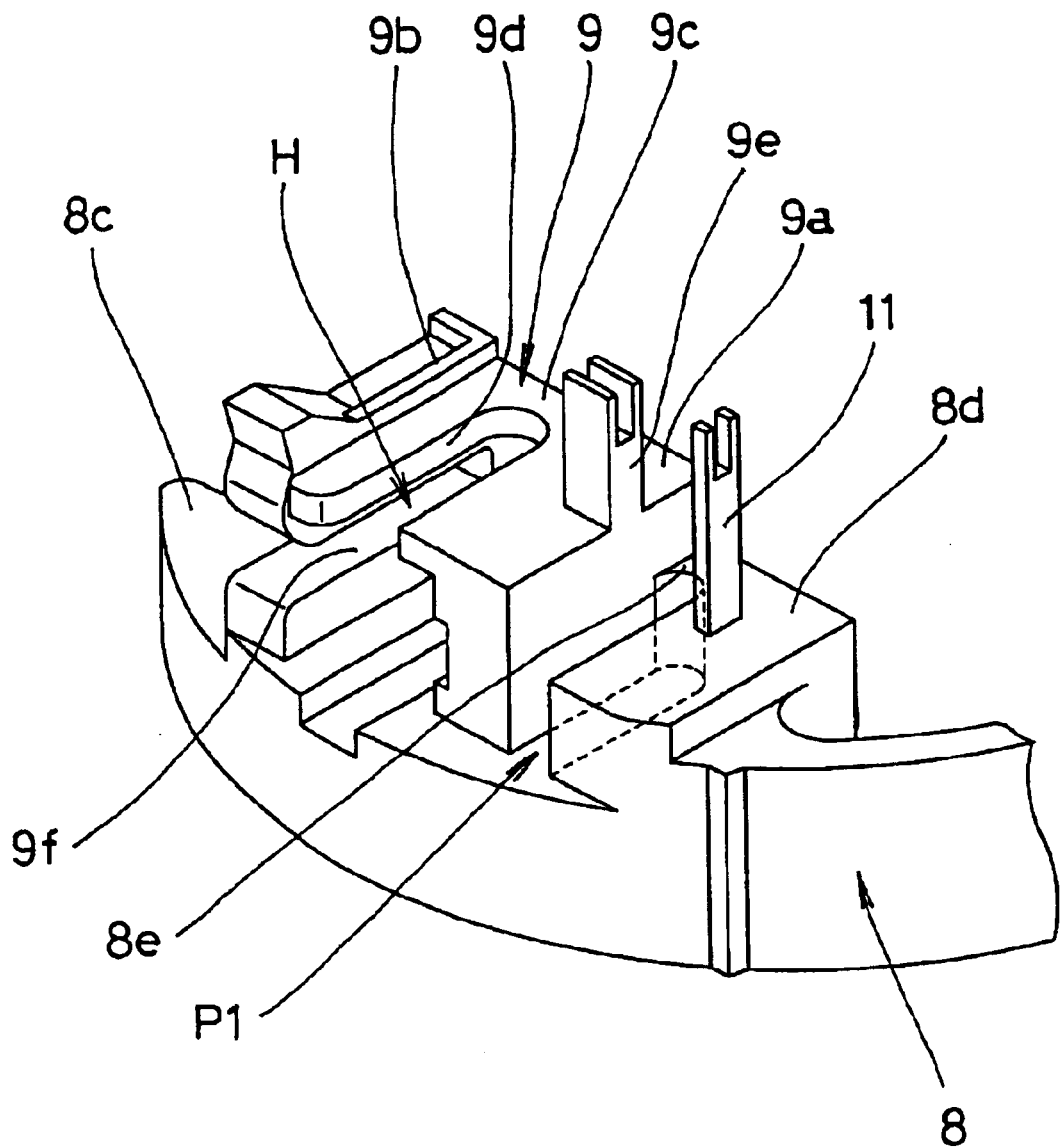
FIG. 7 is a perspective view of a portion, as seen from an outer-radial side, that is produced by cutting out a part of a stay part.
Figure 8:
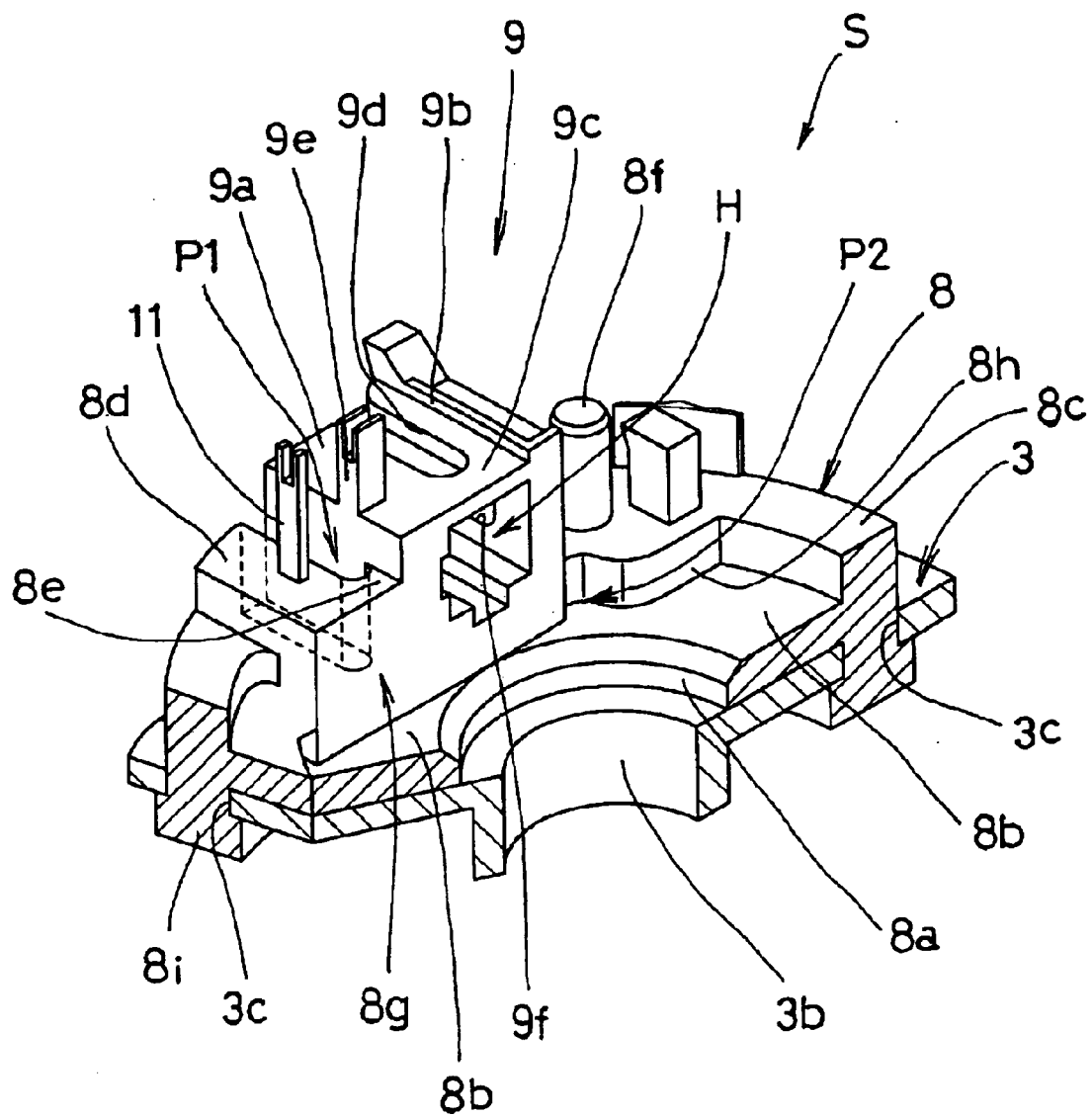
FIG. 8 is a perspective view of a portion, as seen from an inner-radial side, which is produced by cutting out a part of a brush holder stay.

A gap P1 of width W is formed between the holder-portion left side piece portion 9a and the terminal-fixing portion 8d in the left-and-right direction (FIGS. 3 and 7).

The inner-radial side end portion of the gap P1 is blocked by an end wall 8e that has been integrally formed to connect the inner-radial side end portion of the holder-portion left side piece portion 9a and the terminal-fixing portion 8d. As a result, a flat surface like inner-radial side end surface is formed on each of the inner radial surfaces of the holder portion 9, end wall 8e, and terminal-fixing portion 8d. These inner-radial side end surfaces are formed into a stepped surface portion 8g with respect to the thin-wall portion 8b, in the state in which it is contiguous to the through hole 8a.

Also, the gap P1 formed on the left side (one side of the holder portion 9) of the holder portion 9, by its inner-radial side being blocked by the end wall 8e as stated above, becomes a concavity groove portion that has the width W, a depth D as viewed in the axial direction (FIG. 5), and a length L and that is open at its outside-radial end and thereby is designated a first oil pool P1. Regarding the groove depth D of the first oil pool P1, the projecting length of the terminal-fixed portion 8d above the thick-walled portion 8c is set as the groove depth D. Also, the groove length L is set to be substantially the same as the radial length of the holder portion 9, i.e., the radial length of the holder portion 9 minus the thickness of the end wall 8e. Further, the stay part 8 at the right side position of the holder portion 9 is formed so that the thick-walled portion 8c reaches a neighboring position close to the through hole 8a. And it is arranged that, at the neighboring position close to the sintered oil-impregnated bearing 4, there is a stepped surface portion 8h from the thin-wall portion 8b to the surface of the thick-wall portion 8c.

Also, on the stay-part thick-wall portion 8c to the right side of the holder portion 9, a spring-supporting portion 8f is formed projecting toward the inner yoke side. Supported on the spring-supporting portion 8f is an urging spring member 12 that is provided by a torsion spring. One-end 12a of the urging spring 12 abuts on the outer-radial end portion of the brush 10 via an urging groove 9f formed in the holder-portion right side-piece portion 9b. The end portion 12a is set to urge the brush 10 so as to press it in the inner-radial direction.

Reference symbol 8i denotes a ring member that has been molded together with the stay part 8. The ring member 8i is connected to the terminal-fixing portion 8d that is formed to reach the outer side surface of the end plate 3 via the communication hole 3c of the end plate which, as previously discussed, electrically insulates the terminal member 11.

It is arranged that when the brush holder stay S, molded to be integrated with the end plate 3, is assembled to the opening of the yoke 2 in a state where the brush holder stay S is positioned within the yoke 2 and the rotating shaft 1 can be passed through the sintered oil-impregnated bearing 4, the brush 10, projecting from the holder portion 9, is brought into a state of slide-contact with the commutator segments 7b of the rotating shaft 1. Power from an external power source is supplied to the coil 6, wound around the armature 5, by way of the terminal 11, pig tail 10a, brush 10, and commutator segments 7a.

In the rotary electric machine that has been assembled thus, based on the up-and-down direction of the brush holder stay S of this embodiment as illustrated in FIGS. 3 and 4(A), the mutually opposing directions of the holder portions 9 are set to a positional relationship wherein they oppose each other in the up-and-down direction although the mutually opposing directions are somewhat inclined toward the left side (at the top) when viewed in such an orientation. For this reason, when the rotary electric machine is placed under high-temperature conditions, for example, by its being driven, etc., the oil that oozes from the sintered oil-impregnated bearing 4 oozes from the small gaps around the stay-part through hole 8a of the brush holder stay S. The oil that oozes out to the inner side of the brush holder stay S tends to ooze along the thin-wall portion 8b surface toward the outer-radial side. At this time, as seen in the right side portion of the upper half portion side of FIG. 3, as stated above, the thick-wall portion 8c is formed so as to reach the neighborhood of, or close to, the through hole 8a. Therefore, the oil that has oozed from the bearing 4 is guided toward the lower half portion side due to the capillary action alongside the corner (junction) portion formed at the stepped surface portion 8h from the surface of the thin-wall portion 8b. The oil, therefore, is less guided toward the holder portion 9 of the upper half portion side. On the other hand, in the left side portion of the upper half portion side, the oil that is guided, due to the capillary action, alongside the corner portion between the stepped surface portion 8h, constructed by the inner-radial side end surfaces of the holder portion 9, end wall 8e, and terminal-fixing portion 8d, and the thin-wall portion 8b surface, as indicated by the arrows in FIG. 3, is partly passed through the corner (junction) portion located between the terminal-fixing portion 8d and the thin-wall portion 8b. The oil then goes around onto the thick-wall portion 8c side via the corner (junction) portion and further goes around into the outer-radial side of the terminal-fixing portion 8d. Of the oil that has gone around to the outer-radial side, any oil that possibly could ooze into the holder portion 9 from the outer-radial side surface of the terminal-fixing portion 8d becomes trapped in the first oil pool P1 between the terminal-fixing portion 8d and the holder portion 9. As a result of this, oil is prevented from oozing into the holder portion 9.

Further, on the lower half portion side of the stay part 8, the oil oozing out alongside the corner portion between the thin-wall portion 8b and the thick-wall portion 8c due to the capillary action, on the right side as shown in FIG. 3, is passed by the corner (junction) portion between the terminal-fixing portion 8d and the thick-wall portion 8c. The oil then goes toward the outer-radial side (downward) via the corner (junction) portion. Namely, the amount of oil guided into the commutator 7 side, (inner-radial side) theoretically, on the upper side, via the stepped surface portion 8g, is very small. On the other hand, on the left side of the lower half portion side, the oil is guided into the holder portion 9 side alongside the corner portion between the thin-wall portion 8b and the thick-wall portion 8c. However, between the thick-wall portion 8c at the inner-radial side and near the holder portion 9, namely on the opposite side of the holder portion 9 than discussed previously, there is formed a concave second oil pool P2 in the way of its being directed to the outer-radial side. As a result, the oil that would ooze toward the holder portion 9 inner-radial side is trapped by the second oil pool P2 and is thereby prevented from oozing into the holder portion 9 inner-radial side.

In the embodiment of the invention that is structured as described above, in a case where the rotary electric machine has been placed under high-temperature conditions, and the oil oozes from the sintered oil-impregnated bearing 4 that supports the rotating shaft 1, the oil that has oozed moves, due to the capillary action, along the corner portion between the thin-wall portion 8b and thick-wall portion 8c formed on the stay part 8 of the brush holder stay S. In the stay part 8, there is formed the first oil pool P1 that is located at one side of each holder portion 9 and the inner-radial end of the first oil pool P1 has been blocked by the side wall 8e. Therefore, the oil that is guided to the outer-radial side along the corner portion, in the upper half portion of the stay part 8, is trapped by the first oil pool P1, and is prevented from going around into the holder portion 9 outer-radial side and attaching onto the brush 10. As a result of this, oozing of the oil between the brush 10 and the commutator 7 is prevented. Thus, the electrical conduction between them is maintained and prevented from being degraded. Further, abnormal wear of the brush is prevented. As a result, reliability of the product is not only enhanced, but it is also possible to enhance the durability of the product.

In this first embodiment, regarding the lower half portion of the stay part 8, the oil oozes to the outer-radial side, i.e. downward. However, the amount of oil that passes through the holder portion 9 and goes up around the same into between the brush 10 and the commutator 7 is less. In this arrangement, the concave second oil pool P2 is formed in the way of its being adjacent to the left side portion of the holder portion 9. For this reason, in the lower half portion of the stay part 8, the oil oozing toward the outside-radial side (downside) of the holder portion 9 is trapped by the second oil pool P2, with the result that the oil is prevented from oozing out into other portions. Thereby, attaching of the oil onto the brush 10 is decreased, thereby the reliability of the product is further enhanced.

Figure 9:
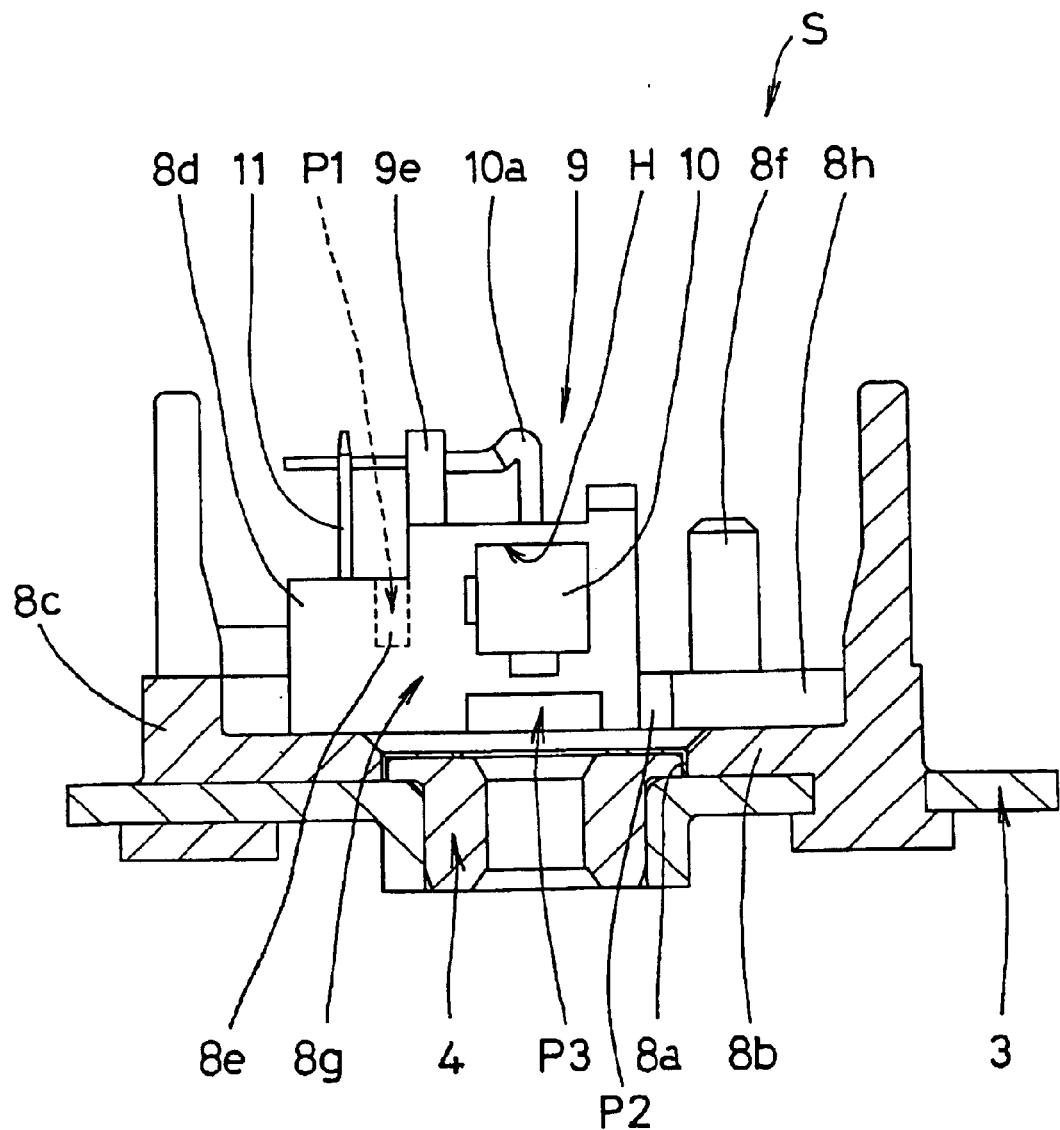
FIG. 9 is a sectional view of a brush holder stay according to a second embodiment.
Figure 10A:
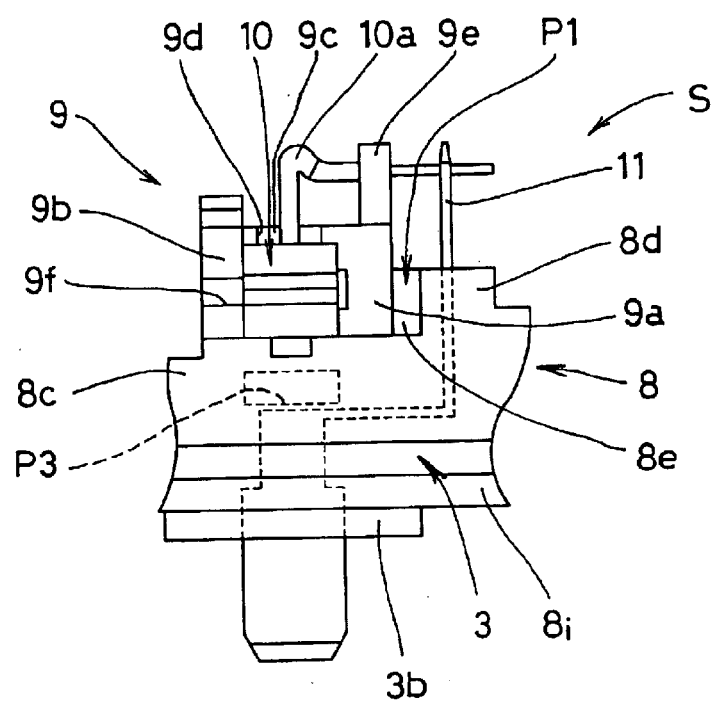
FIGS. 10(A) and 10(B) are a front view and sectional view, respectively, each taken from an outer-radial side of the brush holder stay according to the second embodiment.
Figure 10B:
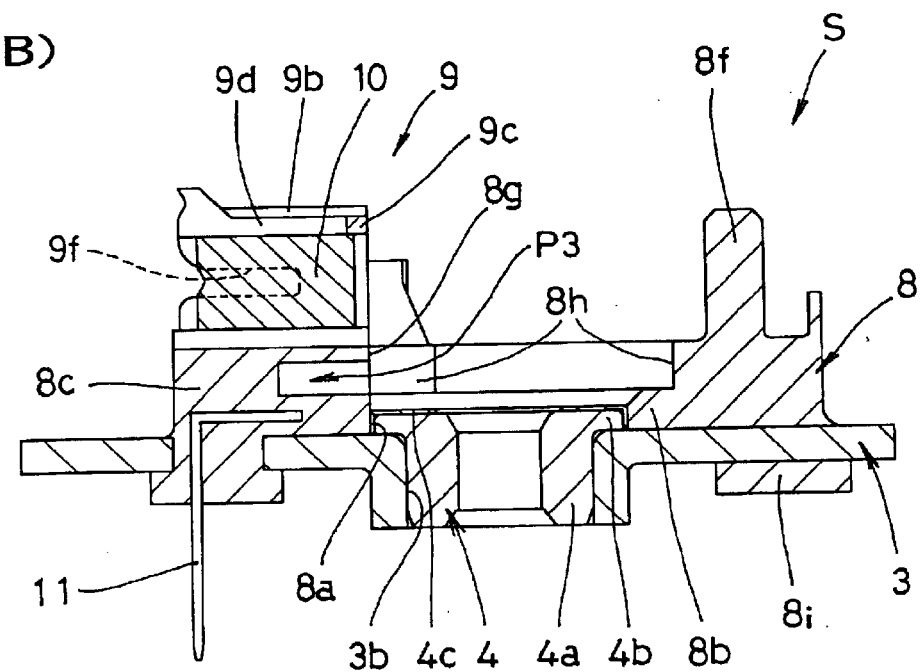
Figure 11:
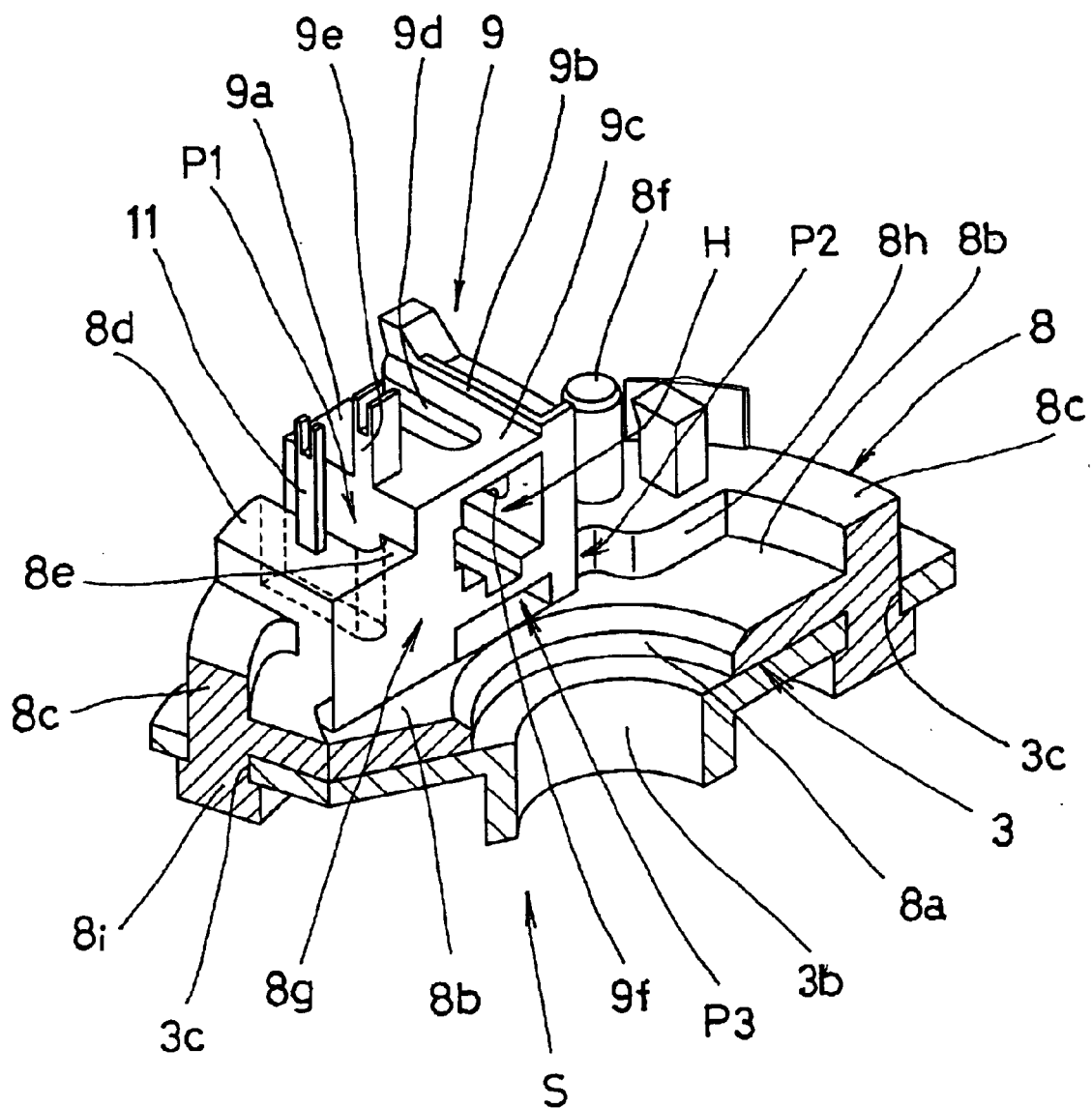
FIG. 11 is a perspective view of a portion, as seen from an inner-radial side, which is produced by cutting out a part of the brush holder stay according to the second embodiment.
Figure 12:
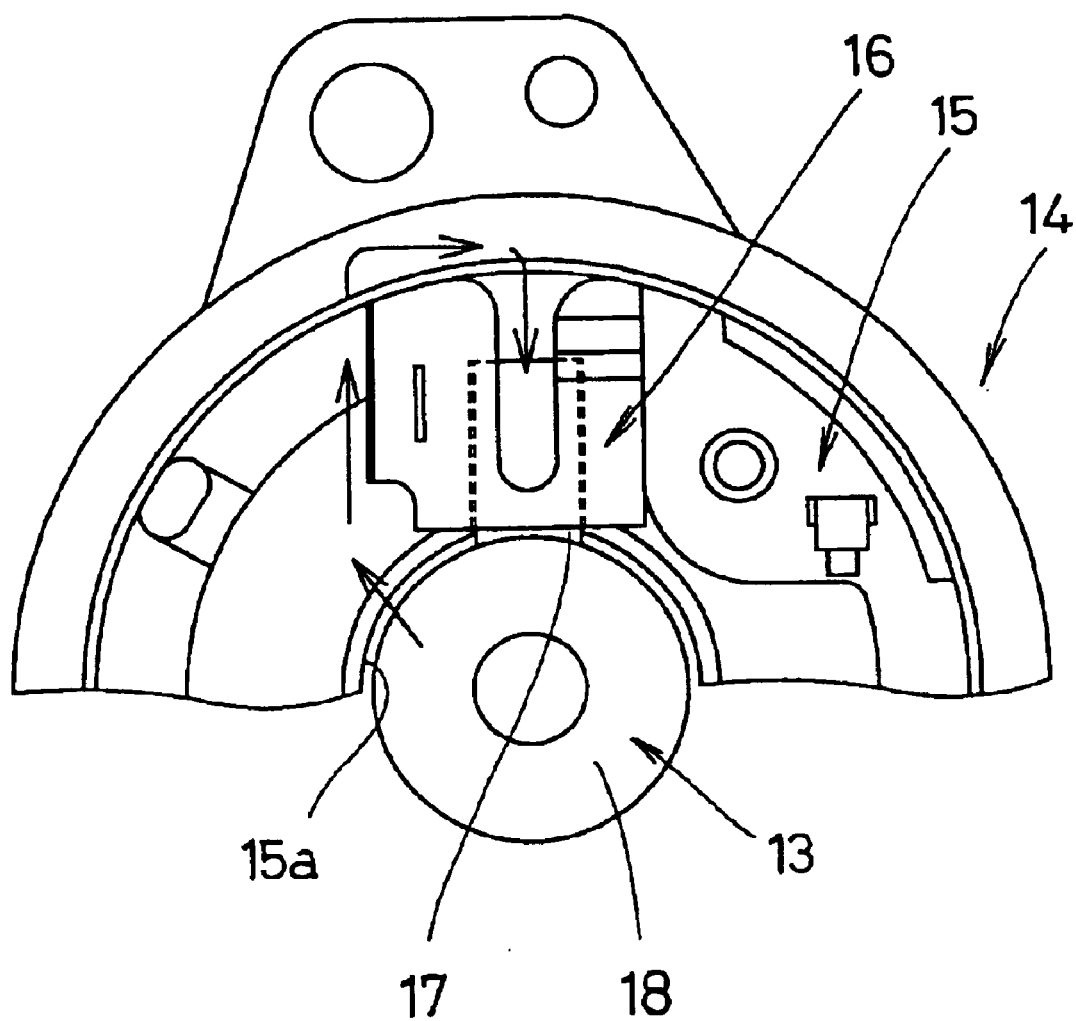
FIG. 12 is a front view of a portion produced by cutting out a part of a brush holder stay in the related art.

The invention is of course not limited to the above-described embodiment and can also be made as a second embodiment illustrated in FIGS. 9 to 11.

In the second embodiment, as in the case of the first embodiment, on one side of the holder portion 9, there is formed a first oil pool P1, and, on the other side thereof, there is formed a second oil pool P2. And, in the arrangement of this second embodiment, in the stepped surface portion 8g that is the inner-radial surface of a portion corresponding to the holder portion 9 forming a zone of the stay part 8 and that has been formed in the way of being contiguous to the through hole 8a, there is formed a concave third oil pool P3 provided extending in the radial direction. As a result of this, in the holder portion 9 forming zone, the oil going from around the stay-part through hole 8a to the junction between the stepped surface portion 8a or 8h and the thin-walled portion 8b is trapped by the third oil pool P3. With respect to the remaining structure, it is the same as in the case of the first embodiment, and enables obtaining the same effects. Namely, in the second embodiment, by forming the third oil pool P3, oozing of the oil can further be prevented thereby decreasing the adverse effect on the brush 10 and thereby further improving the quality of the product.

What is claimed is:

1. A brush holder stay of a rotary electric machine, the brush holder stay comprising:

a ring-shaped stay part that has formed therein on its inner-radial side a through hole having fitted thereinto a sintered oil-impregnated bearing for supporting a rotating shaft; and a holder portion that is integrally formed on the stay part and that accommodates therein a brush slide in contact with a commutator fitted over the rotating shaft in such a manner that the brush freely moves out from and into the holder portion, wherein the stay part is provided with a concave groove portion located on at least one side of the holder portion in the circumferential direction and the concave groove portion is formed with an end wall on the inner radial side and having a depth in the axial direction of the rotating shaft so as to serve as an oil pool for an oil path which goes from the through hole toward the outer-radial side of the holder portion via the stay part.

2. The brush holder stay of a rotary electric machine according to claim 1, wherein the end wall is formed so as to be connected to an inner-radial side end surface of the holder portion.

3. The brush holder stay of a rotary electric machine according to claim 1, wherein the concave groove portion has substantially a same length as the that of the holder portion in the radial direction.

4. The brush holder stay of a rotary electric machine according to claim 2, wherein the concave groove portion has substantially a same length as the that of the holder portion in the radial direction.

5. The brush holder stay of a rotary electric machine according to claim 1, further comprising a terminal-fixing portion, wherein the concave groove portion is formed between the holder portion and the terminal-fixing portion formed adjacent to the holder portion.

6. The brush holder stay of a rotary electric machine according to claim 2, further comprising a terminal-fixing portion, wherein the concave groove portion is formed between the holder portion and the terminal-fixing portion formed adjacent to the holder portion.

7. The brush holder stay of a rotary electric machine according to claim 3, further comprising a terminal-fixing portion, wherein the concave groove portion is formed between the holder portion and the terminal-fixing portion formed adjacent to the holder portion.

8. The brush holder stay of a rotary electric machine according to claim 4, further comprising a terminal-fixing portion, wherein the concave groove portion is formed between the holder portion and the terminal-fixing portion formed adjacent to the holder portion.

9. The brush holder stay of a rotary electric machine according to claim 1, wherein the brush holder stay has formed thereon a pair of holder portions diametrically opposing each other in the radial direction and the paired holder portions are disposed in a positional relationship wherein they oppose each other substantially in the up-and-down direction relative to a horizontal rotating shaft axis.

10. A The brush holder stay of a rotary electric machine according to claim 2, wherein the brush holder stay has formed thereon a pair of holder portions diametrically opposing each other in the radial direction and the paired holder portions are disposed in a positional relationship wherein they oppose each other substantially in the up-and-down direction relative to a horizontal rotating shaft axis.

11. A The brush holder stay of a rotary electric machine according to claim 3, wherein the brush holder stay has formed thereon a pair of holder portions diametrically opposing each other in the radial direction and the paired holder portions are disposed in a positional relationship wherein they oppose each other substantially in the up-and-down direction relative to a horizontal rotating shaft axis.

12. A The brush holder stay of a rotary electric machine according to claim 4, wherein the brush holder stay has formed thereon a pair of holder portions diametrically opposing each other in the radial direction and the paired holder portions are disposed in a positional relationship wherein they oppose each other substantially in the up-and-down direction relative to a horizontal rotating shaft axis.

13. A The brush holder stay of a rotary electric machine according to claim 5, wherein the brush holder stay has formed thereon a pair of holder portions diametrically opposing each other in the radial direction and the paired holder portions are disposed in a positional relationship wherein they oppose each other substantially in the up-and-down direction relative to a horizontal rotating shaft axis.

14. A The brush holder stay of a rotary electric machine according to claim 6, wherein the brush holder stay has formed thereon a pair of holder portions diametrically opposing each other in the radial direction and the paired holder portions are disposed in a positional relationship wherein they oppose each other substantially in the up-and-down direction relative to a horizontal rotating shaft axis.

15. A The brush holder stay of a rotary electric machine according to claim 7, wherein the brush holder stay has formed thereon a pair of holder portions diametrically opposing each other in the radial direction and the paired holder portions are disposed in a positional relationship wherein they oppose each other substantially in the up-and-down direction relative to a horizontal rotating shaft axis.

16. A The brush holder stay of a rotary electric machine according to claim 8, wherein the brush holder stay has formed thereon a pair of holder portions diametrically opposing each other in the radial direction and the paired holder portions are disposed in a positional relationship wherein they oppose each other substantially in the up-and-down direction relative to a horizontal rotating shaft axis.

* * * * *